United States Patent
Runck et al.

(10) Patent No.: US 12,168,327 B2
(45) Date of Patent: Dec. 17, 2024

(54) COUNTER-TOOL, ULTRASONIC WELDING MACHINE AND METHOD FOR PRODUCING A SEAL WELD AND COSMETIC WELD

(71) Applicant: Herrmann Ultraschalltechnik Gmbh & Co. KG, Karlsbad (DE)

(72) Inventors: Andreas Runck, Karlsruhe (DE); Jürgen Pfrommer, Straubenhardt (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 110 days.

(21) Appl. No.: 17/927,823

(22) PCT Filed: Jun. 23, 2021

(86) PCT No.: PCT/EP2021/067074
§ 371 (c)(1),
(2) Date: Nov. 25, 2022

(87) PCT Pub. No.: WO2022/002706
PCT Pub. Date: Jan. 6, 2022

(65) Prior Publication Data
US 2023/0241845 A1 Aug. 3, 2023

(30) Foreign Application Priority Data
Jul. 2, 2020 (DE) .................. 10 2020 117 463.2

(51) Int. Cl.
B29C 65/00 (2006.01)
B29C 65/08 (2006.01)
B29L 31/00 (2006.01)

(52) U.S. Cl.
CPC ........ *B29C 66/81469* (2013.01); *B29C 65/08* (2013.01); *B29C 66/723* (2013.01);
(Continued)

(58) Field of Classification Search
None
See application file for complete search history.

(56) References Cited

U.S. PATENT DOCUMENTS 3,905,862 A    9/1975  Takahashi et al.
6,745,543 B2 * 6/2004  Tillack ............ B29C 66/81419
                                              53/469

(Continued)

FOREIGN PATENT DOCUMENTS

DE    2124437 A     11/1972
DE   10214405 A1    10/2003
(Continued)

OTHER PUBLICATIONS

Agnes Wittmann-Regis, The International Bureau of the World Intellectual Property Organization, International Preliminary Report on Patentability, Report Dated: Dec. 13, 2022, PCT/EP2021/067074 (English translation).

*Primary Examiner* — Barbara J Musser
(74) *Attorney, Agent, or Firm* — PAUL & PAUL

(57) ABSTRACT

The present invention relates to a counter-tool for an ultrasonic welding machine, wherein the counter-tool comprises two separate sealing surfaces which are intended to come into contact with a material to be processed, characterized in that the counter-tool is formed in two parts, wherein the two parts of the counter-tool are movable relative to one another, and each of the two parts comprises one of the two sealing surfaces.

13 Claims, 5 Drawing Sheets

Figure 1:
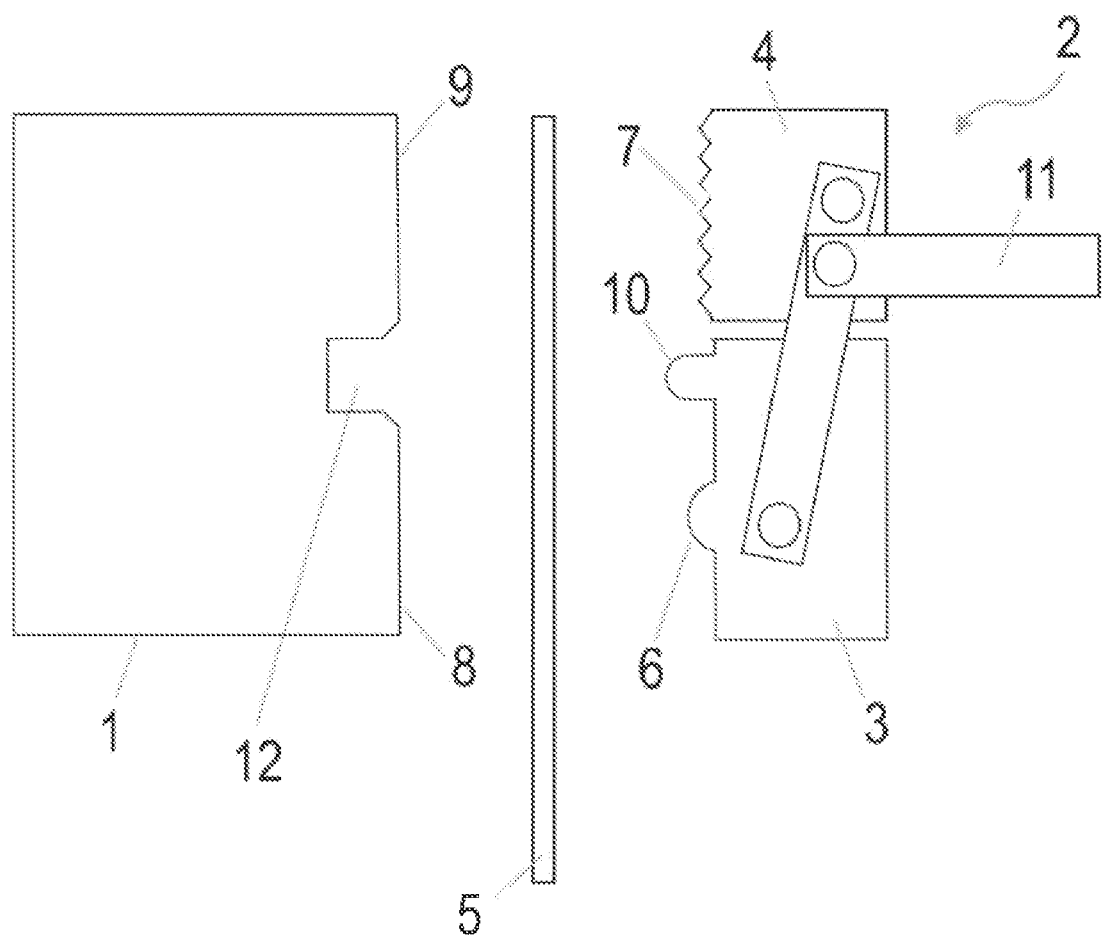

(52) U.S. Cl.
CPC .. *B29C 66/81427* (2013.01); *B29C 66/81435* (2013.01); *B29C 66/83221* (2013.01); *B29C 66/8511* (2013.01); *B29L 2031/7128* (2013.01)

(56) References Cited

U.S. PATENT DOCUMENTS

| | | | |
|---|---|---|---|
| 6,811,631 | B2 | 11/2004 | Moglich |
| 7,059,103 | B2 * | 6/2006 | Ninomiya ........... B29C 66/8145 156/308.2 |
| 7,810,541 | B2 | 10/2010 | Wild et al. |
| 9,517,852 | B2 | 12/2016 | Beauvy et al. |
| 2015/0274337 | A1 * | 10/2015 | Beauvy ............... B29C 66/8145 156/73.4 |

FOREIGN PATENT DOCUMENTS

| | | |
|---|---|---|
| EP | 1232850 A2 | 8/2002 |
| EP | 1447204 A1 | 8/2004 |
| EP | 1854618 A1 | 11/2007 |
| EP | 2926977 A1 | 10/2015 |
| JP | H09278022 A | 10/1997 |

\* cited by examiner

# COUNTER-TOOL, ULTRASONIC WELDING MACHINE AND METHOD FOR PRODUCING A SEAL WELD AND COSMETIC WELD

CROSS-REFERENCE TO RELATED APPLICATIONS

This application is a national phase of International Application PCT/EP2021/067074 filed Jun. 23, 2021 and claims the priority of German Application No. 10 2020 117 463.2, filed on Jul. 2, 2020, each incorporated in their entireties by reference.

The present invention relates to a counter-tool for an ultrasonic welding machine, to an ultrasonic welding machine having such a counter-tool, and to a method for producing a seal weld and cosmetic weld, which method the ultrasonic welding machine uses.

Packaging technology is constantly changing. Recently, recyclable stand-up pouches, e.g., made from polypropylene monomaterials, have been used more often. These pouches are used for the packaging of wet animal feed, for example. In this case, two layers of a generally rectangularly cut material are welded together to form the packaging.

In order to join the layers of material, a so-called seal weld is produced which is intended to ensure that the packaging is tightly sealed. On the side of the seal weld facing away from the product side, there then remain material layer end sections which are not part of the seal weld. These non-welded material layer end sections are undesirable for aesthetic and other reasons so that these components which are not required for the sealing of the packaging are also welded together. A so-called cosmetic weld is thus applied directly next to the seal weld and substantially serves to improve the appearance of the packaging and prevents debris, e.g., product residues, from accumulating in the as yet open portion of the packaging.

This material often comprises a support layer and a sealing layer. In modern recyclable monomaterials for stand-up pouches in particular, the melting temperature difference between the support layer and the sealing layer is low, thus requiring a very high level of process reliability when welding the layers of material. The welding temperature is therefore selected to be as low as possible in order to avoid thermal damage to the support layer. Doing so prevents unwanted shrinkage of the upper edge of the pouch due to excessive heat input. However, the risk that welds will reopen significantly increases.

Often times, the weld is introduced into the material using heat-sealing jaws. Alternatively, the weld may also be produced in an ultrasonic welding machine. For this purpose, the layers of material are positioned between a sonotrode and a counter-tool before the sonotrode is placed in a state of ultrasonic vibration and pressed against the layers of material. The advantage of ultrasonic machining is that heat is only generated where it is actually needed for the welding process.

Generally, the seal weld and the cosmetic weld are introduced into the material in two working steps in separate welding stations. Initial attempts at introducing both the seal weld and the cosmetic weld into the packaging in a single welding station using an ultrasonic welding machine have failed because reliable process control cannot be performed in this case. If the sonotrode and the counter-tool are pressed together with too little force during welding, there is the risk that the cosmetic weld will reopen after welding. In order to prevent this, the force with which the sonotrode and counter-tool are pressed together during the welding process of the layers of material would have to be increased, which could lead to damage to the seal weld. There are instances in which the force would have to be reduced for an optimal seal weld and the force would have to be increased for an optimal cosmetic weld, or vice versa. However, both requirements cannot be met at the same time.

Starting from the described prior art, it is therefore the object of the present invention to provide an ultrasonic welding machine, a counter-tool, and a method that allows reliable and simple production of a seal weld and cosmetic weld.

This object is achieved by a counter-tool for an ultrasonic welding machine, the counter-tool having two separate sealing surfaces, which are provided for contacting a material to be processed. One sealing surface is provided for the production of the seal weld, while the other sealing surface is provided for the production of the cosmetic weld. According to the invention, the counter-tool is formed in two parts, the two parts of the counter-tool being movable relative to one another, and each of the two parts comprising one of the two sealing surfaces.

Due to the relative mobility of the two parts, the force applied by the counter-tool to the material to be processed can then be increased or reduced independently for the two separate sealing surfaces, which significantly increases the process reliability of the described method. In addition, the welding processes for the seal weld and cosmetic weld may be separated in time, which ensures reliable process control since the process parameters for verifying the weld quality can then be evaluated during two separate welding processes.

In one preferred embodiment, at least one of the two parts comprises a drive, by means of which said part can be moved relative to the other part. In a particularly preferred embodiment, it is provided that only one of the two parts comprises a drive, by means of which said part can be moved relative to the other part, wherein said part is best attached to the other part.

In one preferred embodiment, it is provided that the two parts of the counter-tool are movable relative to one another such that, in a first position, the first sealing surface protrudes beyond the second sealing surface and, in a second position, the second sealing surface protrudes beyond the first sealing surface.

This measure can ensure that welding only via the first sealing surface or only via the second sealing surface is possible.

In addition, the counter-tool may comprise a deflection element which pushes the packaging into the slot provided for this purpose in the ultrasonic welding tool (sonotrode), thus preventing the packaging from slipping during the welding process. This fixation of the packaging may be necessary in order to ensure a reliably tight and reproducible ultrasonic welding process for the seal weld. The deflection element can be arranged between the two sealing surfaces. A clamping of the packaging can alternatively also be performed directly above the sealing tools by means of an additional clamping device, thus eliminating the need for the use of a deflection element and slot in the ultrasonic welding tool (sonotrode). Since the cosmetic weld does not have a tightness requirement, the welding of the cosmetic weld can occur without fixation of the packaging.

Furthermore, the first part of the counter-tool may comprise a front surface having a protruding section, which comprises the first sealing surface, wherein the second part of the counter-tool is positioned on the front surface, but not on the protruding section, of the first part of the counter-tool and is movable relative to the front surface.

In a further preferred embodiment, it is provided that the first sealing surface of the counter-tool is an elongated sealing contour with a non-structured surface, while the second sealing surface of the counter-tool, which is provided for producing the cosmetic weld, has a sealing contour with a structured surface. The term "non-structured surface" is understood to mean that the surface is smooth. A "structured surface" is understood to mean that the surface comprises a plurality of separate or interconnected structural elements that protrude from or are inset into the surface to form depressions. The first sealing surface may be planar. However, it may also be convexly curved. For example, the first sealing surface may be in the form of a bead having a radius of between 1 and 5 mm.

With regard to the ultrasonic welding machine, the aforementioned object is achieved by the ultrasonic welding machine having a sonotrode, which can be excited into a state of ultrasonic vibration and comprises the counter-tool described.

In one preferred embodiment, the sonotrode has a planar, optionally discontinuous, sealing surface containing two sealing surface sections, each of which is arranged opposite a sealing surface of the counter-tool. In this respect, a sealing surface section is provided for interaction with the first sealing surface of the counter-tool in order to produce the seal weld, while the other sealing surface section is provided for interaction with the second sealing surface of the counter-tool in order to produce the cosmetic weld.

In a further preferred embodiment, separation of the sealing surface sections in the sonotrode may be omitted.

With respect to the method, said object is achieved by producing a seal weld and cosmetic weld with the following steps:
  A) providing an ultra welding machine according to any of claims 6-7,
  B) arranging a multilayered material to be welded between the sonotrode and the counter-tool,
  C) arranging the two parts of the counter-tool such that the first sealing surface of the counter-tool is arranged closer to the sonotrode than the second sealing surface of the counter-tool,
  D) moving the sonotrode and the counter-tool towards one another so that the multilayered material to be welded comes into contact with both the sealing surface of the sonotrode and the first sealing surface of the counter-tool, wherein, during step D) and/or thereafter, the sonotrode is placed in a state of ultrasonic vibration,
  E) moving the second part of the counter-tool relative to the first part of the counter-tool such that the multilayered material to be welded comes into contact with both the sealing surface of the sonotrode and the second sealing surface of the counter-tool, wherein, during step E) and/or thereafter, the sonotrode is placed in a state of ultrasonic vibration.

In step E), the movement can take place such that the first sealing surface of the counter-tool does not come into contact with the multilayered material to be welded.

The excitation of the sonotrode can already take place during the movement steps D) or E). However, it is also possible that the ultrasonic excitation of the sonotrode only takes place when the movement steps D) or E) have ended and the multilayered material is in contact with the sonotrode and the first or second part of the counter-tool. Moreover, after the movement steps D) or E), a resting phase of 20 ms, for example, may be provided before the sonotrode is excited with an ultrasonic vibration.

Furthermore, it may be advantageous if the multilayered material to be welded is retained by means of a holding device during step D) and/or E) such that relative movement of the individual layers of the multilayered material is prevented.

By separating the welding processes, it is also possible to select the vibration amplitude at which the sonotrode vibrates in the excited state after step D) to differ from that after step E). Although, according to the present invention, both the seal weld and the cosmetic weld can then be produced in only one welding station, the two welds are produced in chronological succession, depending on the position of the second part of the counter-tool. The force applied via the first part of the counter-tool to the multilayered material in order to produce the seal weld has no influence on the cosmetic weld in the embodiment according to the invention since the second part of the counter-tool is not in contact with the multilayered material at that moment. Likewise, the force applied via the second part of the counter-tool to the multilayered material in order to produce the cosmetic weld has no influence on the seal weld since the first part of the counter-tool is not in contact with the multilayered material at that moment.

Figure 2:
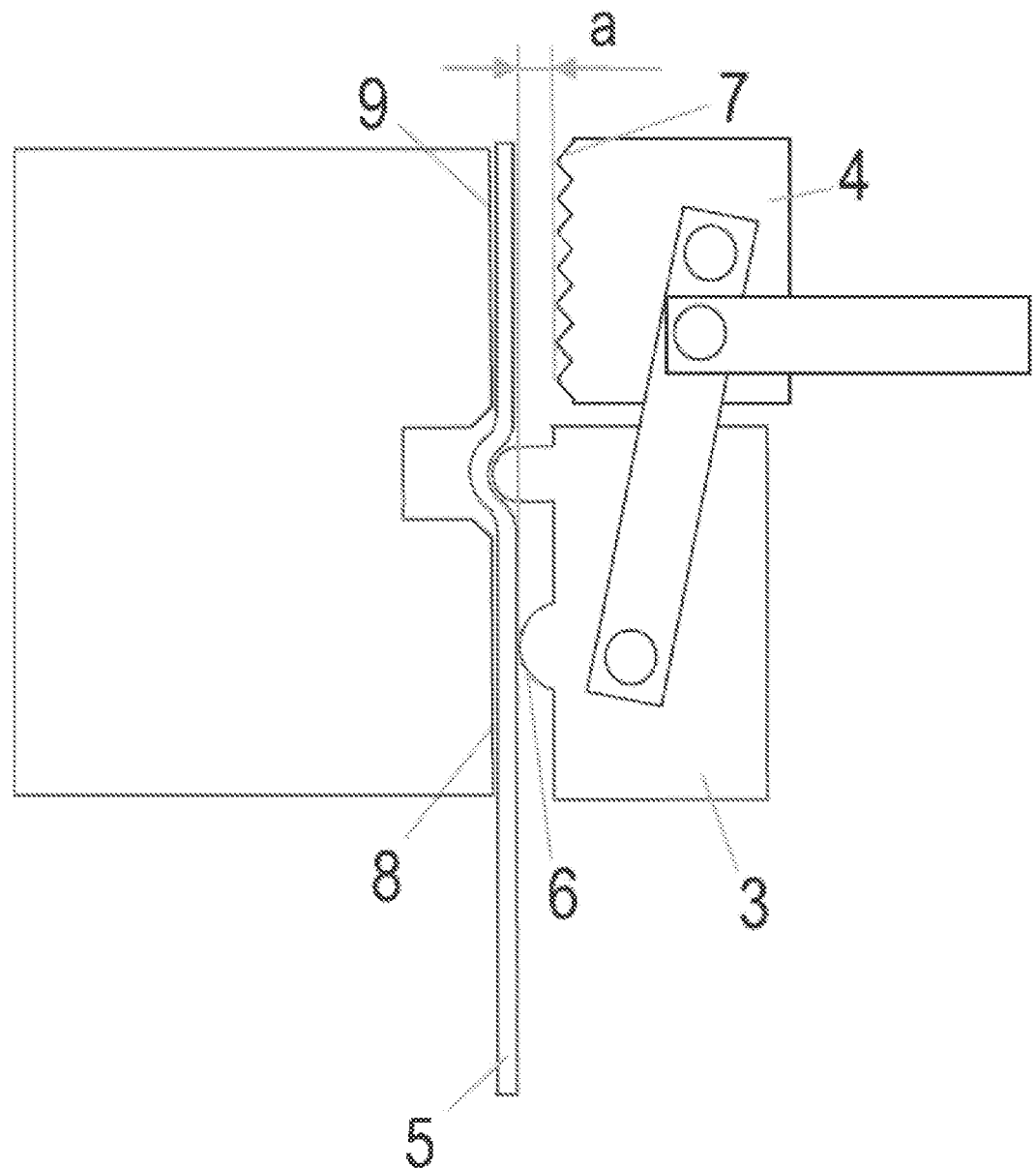
Figure 3:
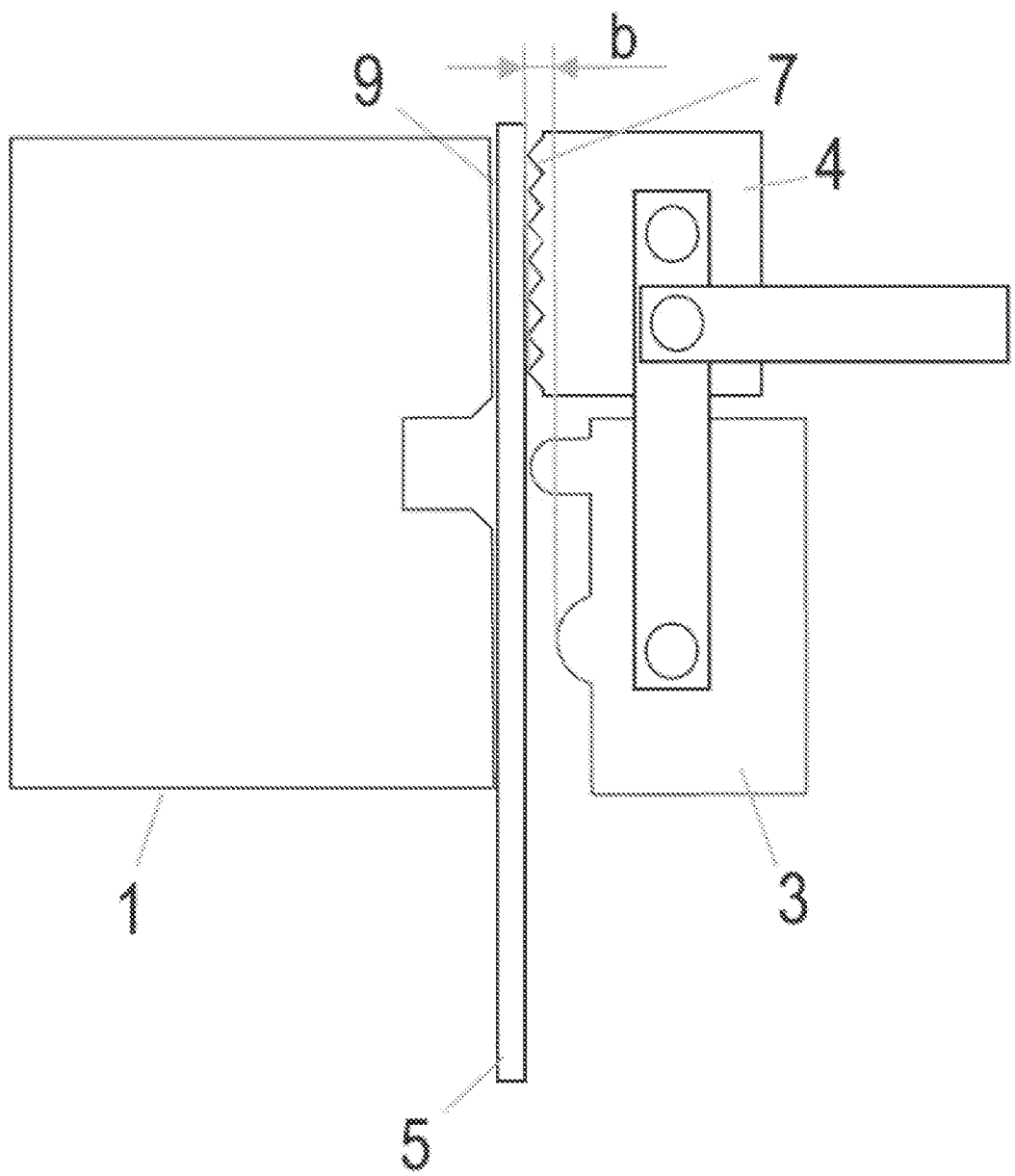
Figure 4:
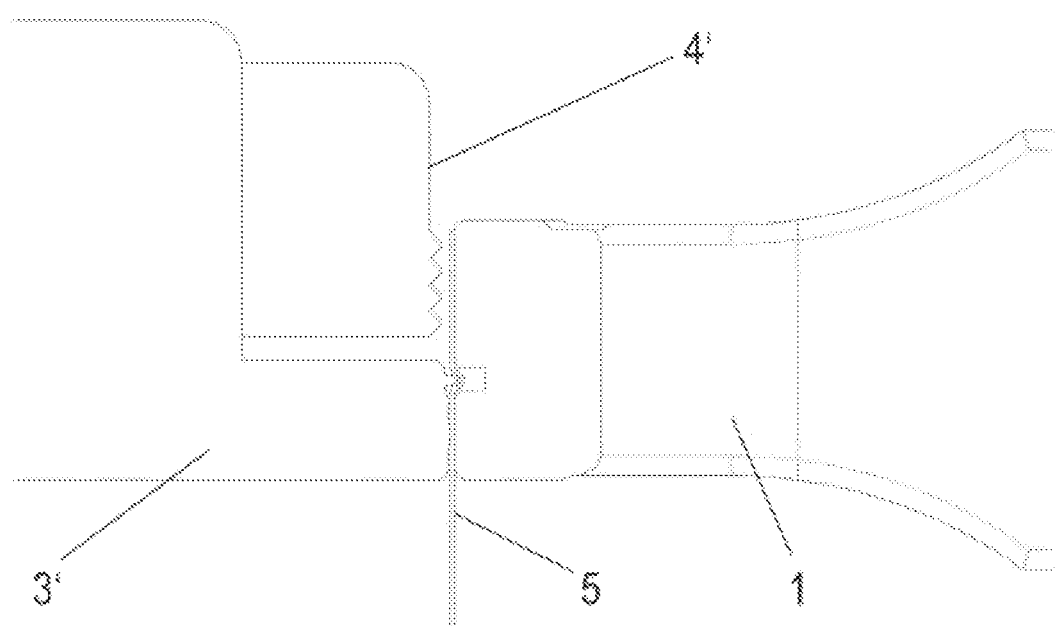

Further advantages, features, and possible applications of the present invention become apparent from the following description of a preferred embodiment and the associated drawings:

The drawings show:

FIG. 1 a schematic view of a first embodiment according to the invention,

FIG. 2 the embodiment of FIG. 1 in a first position,

FIG. 3 the embodiment of FIG. 1 in a second position,

FIG. 4 a side view of a second embodiment in a first position, and

Figure 5:
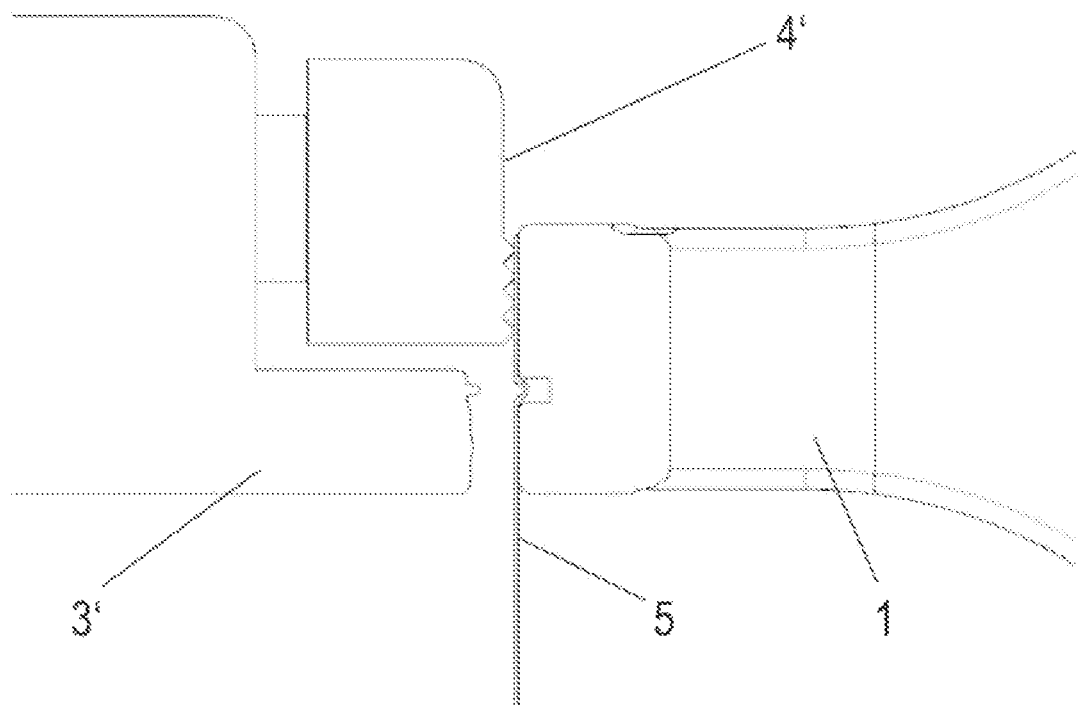

FIG. 5 a side view of the second embodiment in a second position.

FIG. 1 shows a schematic view of a first embodiment of the invention. A sonotrode 1 comprises two sealing surface sections 8, 9, which lie on a common sealing surface. The two sealing surface sections 8, 9 are separated from one another by a recess 12. The sonotrode 1 is arranged on one side of a material 5, which consists of at least two layers of material which are to be welded together. A counter-tool 2 according to the invention is arranged opposite the material 5. The counter-tool likewise comprises two sealing surfaces, specifically the sealing surface 6 and the sealing surface 7. Arranged between the two sealing surfaces is a deflection element 10 which, when the sonotrode and the counter-tool are moved together, enters the recess 12 of the sonotrode and fixes the material 5 therein such that the individual layers of the multilayered material cannot slide relative to one another.

The counter-tool 2 consists of two parts, specifically a first part 3 and a second part 4. The first part 3 comprises the first sealing surface 6. The second part 4 comprises the second sealing surface 7, which is structured at its surface in the example shown. In order to perform the method according to the invention, the counter-tool is first brought into the position shown in FIG. 2, i.e., the second part 4 of the counter-tool 2 is moved relative to the first part 3 of the counter-tool 2 by means of the mechanism 11, specifically such that the first sealing surface 6 protrudes towards the sonotrode 1 in comparison to the second sealing surface 7. In this position of the counter-tool, the sonotrode and counter-tool are then moved towards one another so that the material 5 is clamped between the sealing surface 8 of the sonotrode and the sealing surface 6 of the first part 3 of the counter-tool 2, thus welding the layers of material together. A seal weld is thus produced.

In the next step, the mechanism 11 of the counter-tool is actuated in order to bring the counter-tool into the position shown in FIG. 3. In this position, the second part 4 of the counter-tool 2 protrudes towards the sonotrode 1 in comparison to the first part 3 of the counter-tool 2. The distances between the highest elevations of the sealing surfaces 6 and 7 are b and a, respectively, as shown in FIGS. 2 and 3. In the embodiment according to the invention, a and b each measure approximately 1 mm.

In the position shown in FIG. 3, given the advanced position of the second part 4 of the counter-tool 2, a welding process then takes place between the sealing surface 7 of the counter-tool 2 and the sealing surface 9 of the sonotrode 1.

It is also possible to first produce the cosmetic weld using the second part 4 of the counter-tool 2 and to thereafter produce the seal weld using the first part 3 of the counter-tool 2.

The counter-tool may also be of a different construction, as shown in FIGS. 4 and 5. In this case, the counter-tool is also formed in two parts, consisting of a first part 3', which has a stepped surface aligned towards the sonotrode 1, wherein the sealing surface 6 which, in the position shown in FIG. 4, pushes the material 5 onto the sonotrode 1 is on the protruding part of the step. In the position shown in FIG. 4, the second part 4' of the counter-tool 2 is not in contact with the material. The second part 4' is arranged on the stepped surface of the first part of the counter-tool so that it does not protrude beyond the stepped section.

However, as can be seen in FIG. 5, the second part 4' of the counter-tool can be moved towards the sonotrode 1 so that the second part 4' protrudes from the stepped section of the first part 3' and only the second part 4' or its sealing surface, which is provided with structural elements, comes into contact with the material 5 and presses it against the sonotrode 1. Comparing the positions shown in FIGS. 4 and 5, it becomes evident that, in FIG. 5, the first part 3' of the counter-tool has moved away from the sonotrode 1, whereas the second part 4' has moved towards the sonotrode.

In the embodiment shown, the second part 4' is moved back and forth relative to the first part 3' of the counter-tool 4 by means of a pneumatic cylinder. In order to determine the welding position shown in FIG. 5 for the cosmetic weld, a stop may be provided which interacts with either the second part 4' or the pneumatic cylinder in order to prevent movement of the second part 4' towards the sonotrode 1 beyond the position shown in FIG. 5.

By means of the invention, a seal weld and a cosmetic weld can then be produced at one welding station. The two parts of the counter-tool can in this case be pressed onto the material with the desired welding force.

REFERENCE SIGNS

1 Sonotrode
2 Counter-tool
3 First part
3' First part
4 Second part
4' Second part
5 Material
6 First sealing surface
7 Second sealing surface
8, 9 Sealing surface section
10 Deflection element
11 Mechanism
12 Recess

The invention claimed is:

1. Counter-tool for an ultrasonic welding machine, wherein the counter-tool comprises two separate sealing surfaces which are adapted to come into contact with a material to be processed, characterized in that the counter-tool is formed in two parts, wherein the two parts of the counter-tool are movable relative to one another, and each of the two parts comprises one of the two sealing surfaces, wherein the two parts of the counter-tool are movable relative to each other such that, in a first position, the first sealing surface protrudes beyond the second sealing surface and, in a second position, the second sealing surface protrudes beyond the first sealing surface such that welding is possible only via the first sealing surface or only via the second sealing surface, wherein the first sealing surface is provided for the production of a seal weld while the second sealing surface is provided for the production of a cosmetic weld.

2. Counter-tool according to claim 1, characterized in that the counter-tool comprises a deflection element.

3. Counter-tool according to claim 2, wherein the deflection element is arranged between the two sealing surfaces.

4. Counter-tool according to a claim 1, characterized in that the first part of the counter-tool comprises a front surface which has a protruding section and comprises the first sealing surface, wherein the second part of the counter-tool is positioned on the front surface, but not on the protruding section, of the first part of the counter-tool and is movable relative to the front surface.

5. Counter-tool according to claim 1, characterized in that one of the two sealing surfaces, of the counter-tool has an elongated sealing contour with a non-structured surface, while the other of the two sealing surfaces of the counter-tool has a sealing contour with a structured surface.

6. Ultrasonic welding machine having a sonotrode which can be excited into a state of ultrasonic vibration and having a counter-tool according to claim 1, the sonotrode having a planar sealing surface.

7. Ultrasonic welding machine according to claim 6, characterized in that the planar sealing surface contains two sealing surface sections, which are each arranged opposite a sealing surface of the counter-tool.

8. Ultrasonic welding machine according to claim 7, wherein the sealing surface of the sonotrode is discontinuous.

9. Method for producing a seal weld and a cosmetic weld, comprising the following steps:
A) providing an ultrasonic welding machine according to claim 6,
B) arranging a multilayered material to be welded between the sonotrode and the counter-tool,
C) arranging the two parts of the counter-tool such that the first sealing surface of the counter-tool is arranged closer to the sonotrode than the second sealing surface of the counter-tool,
D) moving the sonotrode and the counter-tool towards one another so that the multilayered material to be welded comes into contact with both the sealing surface of the sonotrode and the first sealing surface of the counter-tool, wherein, during this step D) and/or thereafter, the sonotrode is placed in a state of ultrasonic vibration to produce the seal weld,
E) moving the second part of the counter-tool relative to the first part of the counter-tool such that the multilayered material to be welded comes into contact with both comprises one of the two sealing surfaces, wherein the two parts of the counter-tool are movable relative to each other such that, in a first position, the first sealing surface protrudes beyond the second sealing surface and, in a second position, the second sealing surface protrudes beyond the first sealing surface such that welding is possible only via the first sealing surface or only via the second sealing surface, wherein the first sealing surface is provided for the production of a seal weld while the second sealing surface is provided for the production of a cosmetic weld.

10. Method according to claim 9, characterized in that the multilayered material to be welded is retained by means of a holding device during step D) and/or E) such that relative movement of the individual layers of the multilayered material is prevented.

11. Counter-tool according to claim 1, characterized in that a first of the two sealing surfaces of the counter-tool has an elongated sealing contour with a non-structured surface, while the second of the two sealing surfaces of the counter-tool has a sealing contour with a structured surface.

12. Ultrasonic welding machine having a sonotrode which can be excited into a state of ultrasonic vibration and having a counter-tool comprising two separate sealing surfaces which are adapted to come into contact with a material to be processed, characterized in that the counter-tool is formed in two parts, wherein the two parts of the counter-tool are movable relative to one another, and each of the two parts comprises one of the two sealing surfaces, wherein the two parts of the counter-tool are movable relative to each other such that, in a first position, the first sealing surface protrudes beyond the second sealing surface and, in a second position, the second sealing surface protrudes beyond the first sealing surface such that welding is possible only via the first sealing surface or only via the second sealing surface, wherein the first sealing surface is provided for the production of the seal weld while the second sealing surface is provided for the production of the cosmetic weld.

13. Method for producing a seal weld and a cosmetic weld, comprising the following steps:
A) providing an ultrasonic welding machine having a sonotrode which can be excited into a state of ultrasonic vibration and having a counter-tool comprising two separate sealing surfaces which are adapted to come into contact with a material to be processed, characterized in that the counter-tool is formed in two parts, wherein the two parts of the counter-tool are movable relative to one another, and each of the two parts comprises one of the two sealing surfaces,
B) arranging a multilayered material to be welded between the sonotrode and the counter-tool,
C) arranging the two parts of the counter-tool such that the first sealing surface of the counter-tool is arranged closer to the sonotrode than the second sealing surface of the counter-tool,
D) moving the sonotrode and the counter-tool towards one another so that the multilayered material to be welded comes into contact with both the sealing surface of the sonotrode and the first sealing surface of the counter-tool, wherein, during this step D) and/or thereafter, the sonotrode is placed in a state of ultrasonic vibration to produce the seal weld.

* * * * *